United States Patent
Shi et al.

(10) Patent No.: US 8,292,248 B2
(45) Date of Patent: Oct. 23, 2012

(54) ROTATABLE PLATFORM

(75) Inventors: Bin Shi, Hong Kong (CN); Xing Quan Li, Shenzhen (CN); Hong Li, Shenzhen (CN); Yong Gang Zhang, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 256 days.

(21) Appl. No.: 12/552,042

(22) Filed: Sep. 1, 2009

(65) Prior Publication Data
US 2010/0051774 A1 Mar. 4, 2010

(30) Foreign Application Priority Data
Sep. 1, 2008 (CN) .......................... 2008 1 0141802

(51) Int. Cl.
*F16M 11/00* (2006.01)
(52) U.S. Cl. ............... 248/349.1; 348/178.1; 348/125.7; 348/278.1
(58) Field of Classification Search ............... 248/349.1, 248/125.7, 131, 425, 178.1, 183.1, 183.2, 248/278.1, 282.1, 289.11
See application file for complete search history.

(56) References Cited

U.S. PATENT DOCUMENTS

| | | | | |
|---|---|---|---|---|
| 4,566,664 A | * | 1/1986 | Donald | 248/349.1 |
| 4,697,694 A | * | 10/1987 | Huber | 198/782 |
| 5,622,343 A | * | 4/1997 | Morton | 248/131 |
| 6,079,682 A | * | 6/2000 | Olkkola | 248/278.1 |
| 6,152,409 A | * | 11/2000 | Schrepfer | 248/188.2 |
| 7,007,906 B2 | * | 3/2006 | Slatter | 248/276.1 |
| 7,616,229 B2 | | 11/2009 | Wada et al. | |
| 2008/0179482 A1 | * | 7/2008 | van Amelsfoort | 248/349.1 |
| 2009/0045312 A1 | * | 2/2009 | Holt et al. | 248/349.1 |

FOREIGN PATENT DOCUMENTS

| | | |
|---|---|---|
| CN | 22313-1450 A | 5/2004 |
| CN | 2781662 Y | 5/2006 |
| CN | 201107450 Y | 8/2008 |

* cited by examiner

*Primary Examiner* — Terrell McKinnon
*Assistant Examiner* — Steven Marsh
(74) *Attorney, Agent, or Firm* — Muncy, Geissler, Olds & Lowe, PLLC

(57) ABSTRACT

A platform comprising: a base; a first platform unit rotatably mounted to the base and being rotatable about a first axis relative to the base; a second platform unit rotatably mounted to the first platform unit and be rotatable about a second axis relative to the first platform unit; and a flexible transmitting device connected between the base and the first platform unit and/or the first platform unit and the second platform unit for transmitting power and/or data. The flexible transmitting device is arranged to wind about the first axis when the first platform unit is rotated about the first axis and/or wind about the second axis when the second platform unit is rotated about the second axis.

20 Claims, 8 Drawing Sheets

ROTATABLE PLATFORM

CROSS REFERENCE TO RELATED APPLICATIONS

This non-provisional patent application claims priority under 35 U.S.C. §119(a) from Patent Application No. 200810141802.9 filed in The People's Republic of China on Sep. 1, 2008.

FIELD OF THE INVENTION

This invention relates to a movable platform and in particular, to a movable platform for a camera or the like.

BACKGROUND OF THE INVENTION

Omni-directional camera systems that are operable to orient a camera to image scenes in a relatively wide range of different directions are relatively common and are used in many different applications. They may be used for example for surveillance and/or alarm systems and for robotic vision.

Usually, omni-directional camera systems use cables to transmit power and/or data. When the platform of the system is rotated the cable is twisted. The twisted cable will generate a resistance force to the platform, which requires the drive motor of the camera system to generate a greater driving force to overcome the resistance force in addition to moving the platform. Furthermore, the cable may be damaged by being frequently twisted.

SUMMARY OF THE INVENTION

Hence there is a desire for a improved rotatable platform especially one suitable for a camera system.

Accordingly, in one aspect thereof, the present invention provides a platform comprising: base; a first platform unit rotatably mounted to the base and being rotatable about a first axis relative to the base; a second platform unit rotatably mounted to the first platform unit and be rotatable about a second axis relative to the first platform unit; and a flexible transmitting device connected between the base and the first platform unit and/or the first platform unit and the second platform unit for transmitting power and/or data, wherein the flexible transmitting device winds about the first axis and/or the second axis when the first platform unit is rotated about the first axis and/or the second platform unit is rotated about the second axis.

Preferably, the first platform unit is rotatably attached to the base via a shaft which is fixed to or integrally formed with the first platform unit, the flexible transmitting device being connected between the base and the first platform unit and winding around the shaft when the first platform unit is rotated about the first axis.

Preferably, the shaft has a void, one end of the flexible transmitting device is fixed relative to the base and the other end thereof extends through the void of the shaft and an opening defined in the first platform unit to be fixed relative to the first platform unit.

Preferably, the flexible transmitting device is a flexible cable or flexible printed circuit board.

Preferably, the flexible transmitting device is connected between the first platform unit and the second platform unit, one end of the flexible transmitting device is fixed relative to the first platform unit and the other end thereof is fixed relative to the second platform unit.

Preferably, the second platform unit is rotatably attached to the first platform unit via a shaft of the second platform unit being rotatably received in a hole of the first platform unit, the flexible transmitting device is arranged to wind around the shaft when the second platform unit is rotated.

Preferably, the flexible transmitting device has an S or C shaped configuration when it is unwound.

Preferably, the first platform unit is rotatable by a piezoelectric motor which is attached to one of the first platform unit and the base, the motor having a frictional nub to contact the other one of the first platform unit and the base.

Preferably, the first platform unit comprises a shaft rotatably received in a hole formed at the base, the motor being mounted to the base and the friction nub pressing resiliently against the outer circumferential surface of the shaft.

Preferably, the base comprises a circular rim, the motor being mounted to the first platform unit and the nub pressing resiliently against an inner circumferential surface of the rim.

Preferably, the first platform unit defines a slot parallel to the first axis, the motor being received in the slot.

Preferably, the first platform unit comprises a base plate rotatably attached to the base, and a support plate extending from the base plate, and the second platform unit comprises a mounting plate rotatably attached to the support plate, a camera being mounted to the mounting plate.

Preferably, the support plate defines a recess in which the mounting plate is rotatably received, the mounting plate defines a slot on which a piezoelectric motor with a frictional nub and a resilient element are received, the resilient element urging the motor such that the friction nub presses resiliently against a surface of the recess.

Preferably, the second platform unit further comprises a shaft fixed relative to the mounting plate, the support plate defines a slot in which a piezoelectric motor with a frictional nub and a resilient element are received, and a hole in which the shaft is rotatably received, the resilient element urging the motor such that the friction nub presses resiliently against the outer circumferential surface of the shaft.

Preferably, the first axis is perpendicular to the second axis.

According to a second aspect, the present invention also provides a platform comprising: a base; a first platform unit rotatably mounted to the base and being rotatable about a first axis relative to the base; a flexible transmitting device connected between the base and the first platform unit for transmitting power and/or data, wherein the flexible transmitting device winds about the first axis when the first platform unit is rotated about the first axis.

Preferably, the first platform unit is rotatably attached to the base via a shaft which is fixed to or integrally formed with the first platform unit, the flexible transmitting device winding around the shaft when the first platform unit is rotated about the first axis.

Preferably, the first platform unit is rotatable by a piezoelectric motor which is attached to one of the first platform unit and the base, the motor having a friction nub which contacts the other one of the first platform unit and the base.

Preferably, the motor is mounted to the base and the friction nub presses resiliently against the outer circumferential surface of the shaft.

Preferably, the base comprises a circular rim, the motor being mounted to the first platform unit and the friction nub pressing resiliently against an inner circumferential surface of the rim.

Preferably, the first platform unit defines a slot parallel to the first axis, the motor being received in the slot.

BRIEF DESCRIPTION OF THE DRAWINGS

Preferred embodiments of the invention will now be described, by way of example only, with reference to figures of the accompanying drawings. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1A:
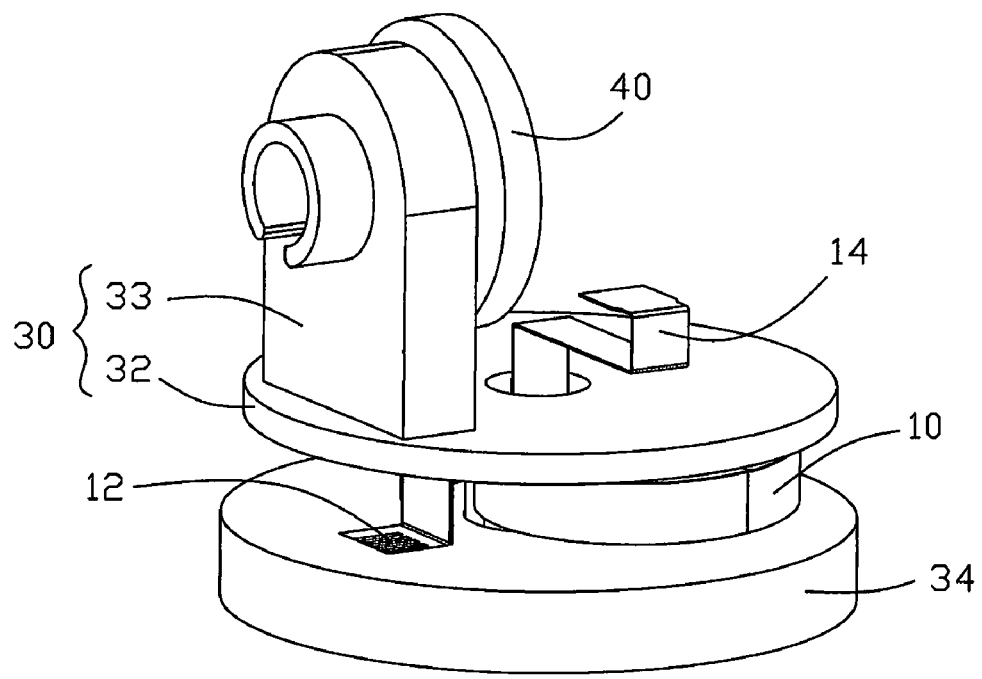
FIG. 1A shows a platform in accordance with a first embodiment of the present invention.
Figure 1B:
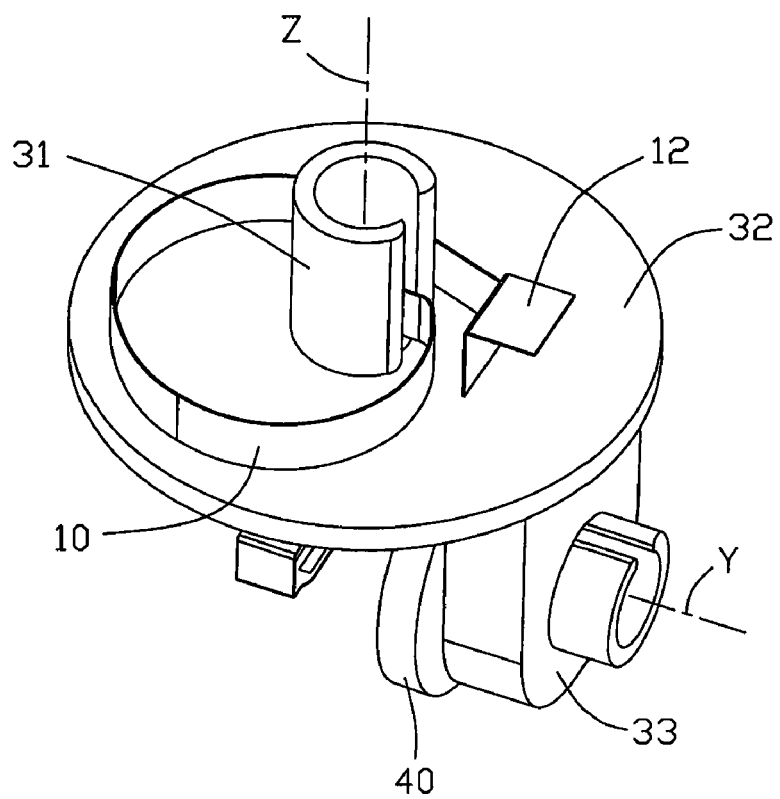
FIG. 1B shows the platform of FIG. 1A in another view, where the flexible cable is unwound.
Figure 1C:
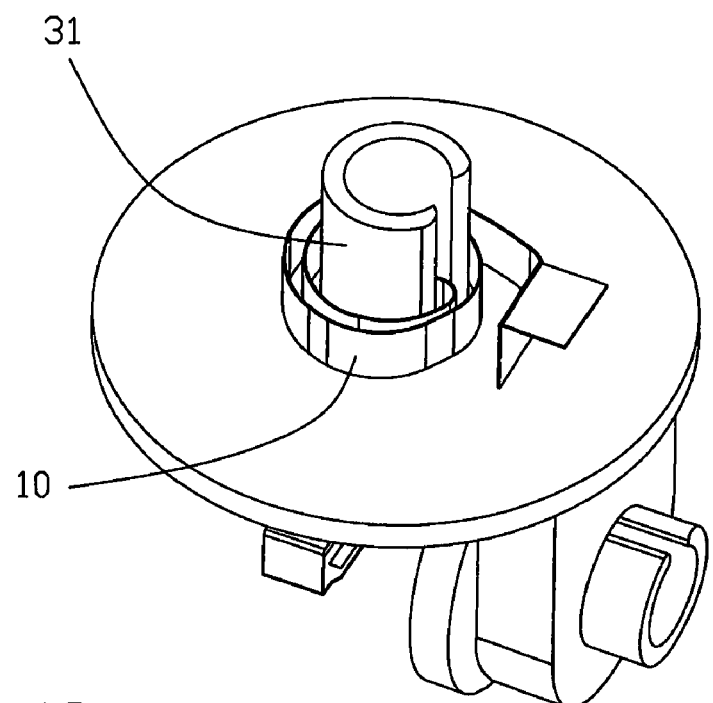
FIG. 1C shows the platform of FIG. 1A in another view, where the flexible cable is wound.

FIGS. 1A-1C illustrate a platform in accordance with a first embodiment of the present invention comprises a first platform unit 30 and a second platform unit 40. The first platform unit 30 comprises a base plate 32 and a support plate 33 extending from the base plate 32. The base plate 32 is rotatably mounted to a base 34 via a hollow shaft 31. The shaft 31 may be attached to or integrally formed with the base plate 32. The base plate 32 together with the shaft 31 is rotatable about the axis Z of the shaft 31 with respect to the base 34. The second platform unit 40 is rotatably mounted to the support plate 33 of the first platform unit 30 and is rotatable about the axis Y with respect to the support plate 33. Preferably, the axis Y is perpendicular to the axis Z.

A flexible cable 10 is connected between the base 34 and the base plate 32 of the first platform unit 30, for data and/or power transmission. The cable 10 comprises a terminal 12 fixed relative to the base 34 for electrically connecting to an outside electronic device such as a power source etc, and an opposite terminal 14 extending through a void inside the shaft 31 to be mounted to a component (not shown) installed on a surface of the base plate 32 remote from the base 34. The main portion of the cable 10 between the two terminals 12 and 14 is arranged to wind round the shaft 31, as shown in FIG. 1C.

Figure 2A:
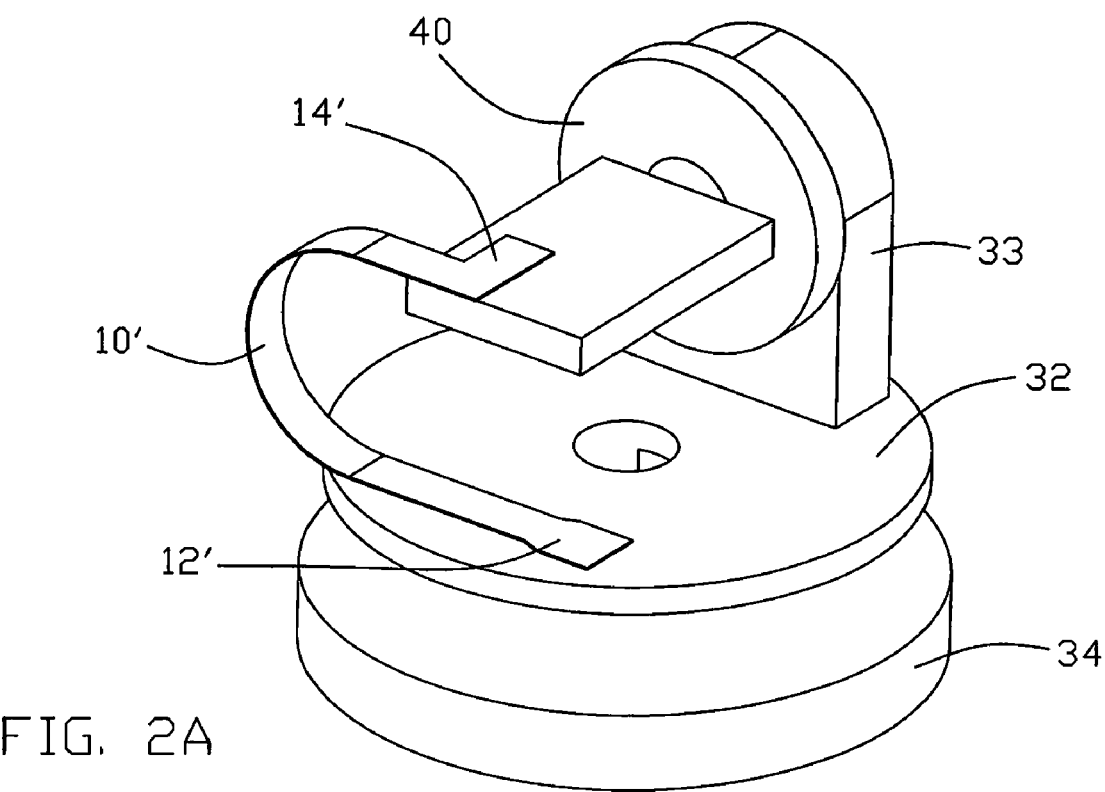
FIGS. 2A-2C show three variations of a platform with a flexible cable connected between first and second platform units in accordance with a second embodiment of the present invention.
Figure 2B:
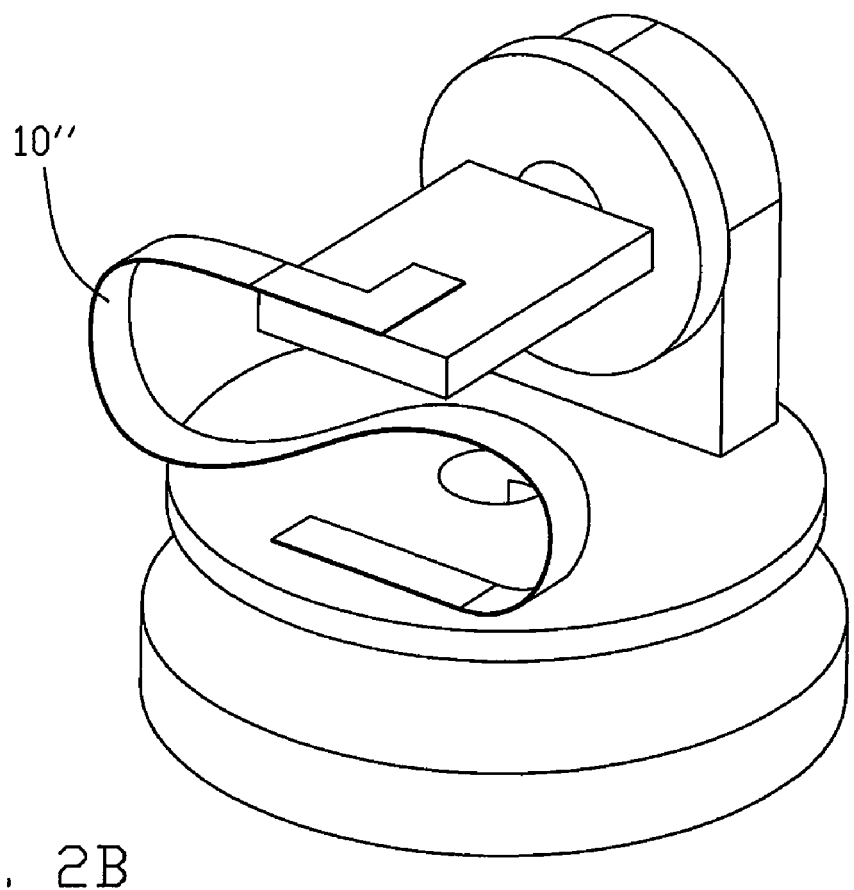
Figure 2C:
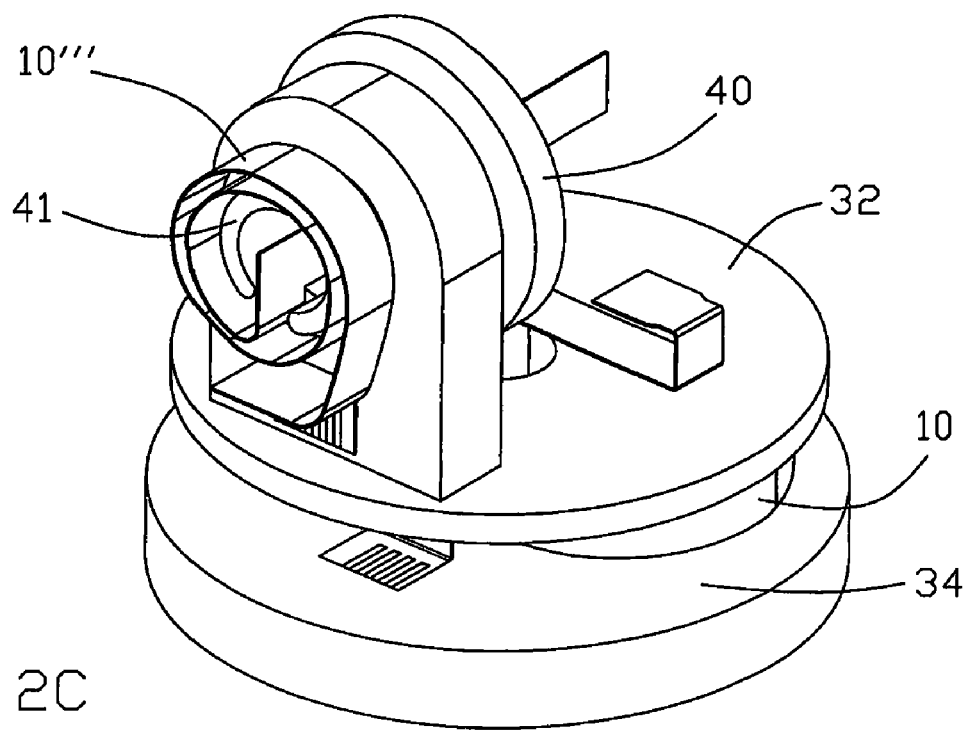
Figures 3A, 3B:
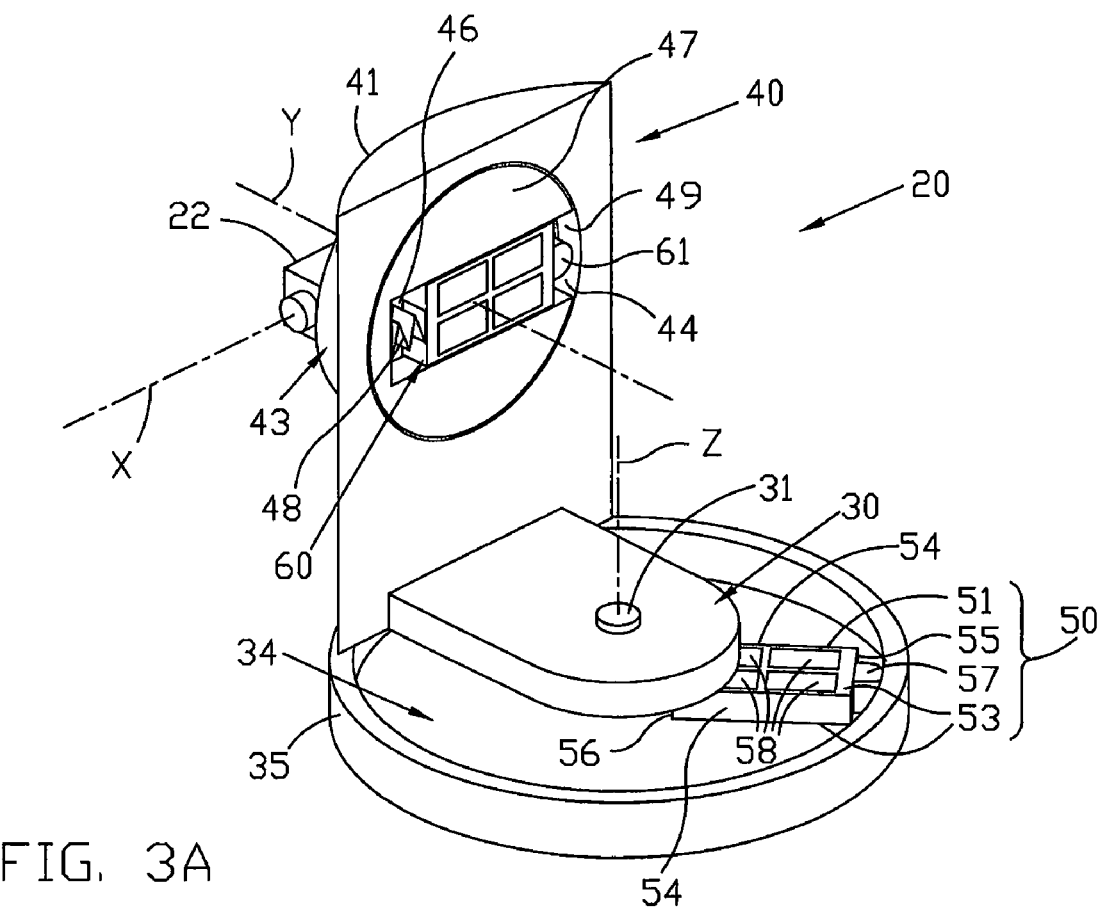
FIGS. 3A-3D show a camera system applying a platform in accordance with a third embodiment of the present invention.
Figure 3C:
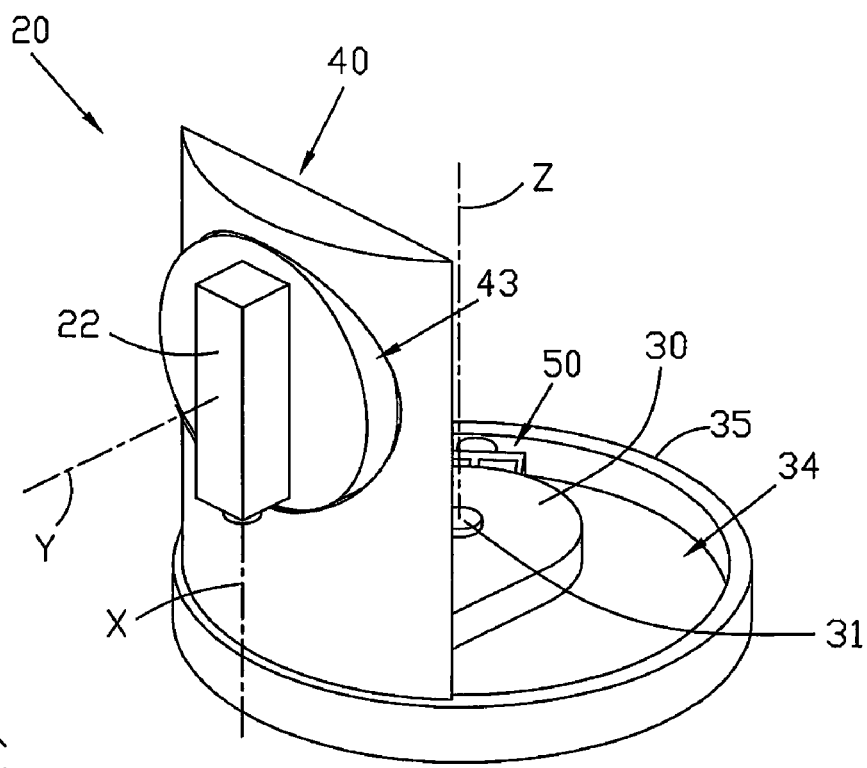
Figure 3D:
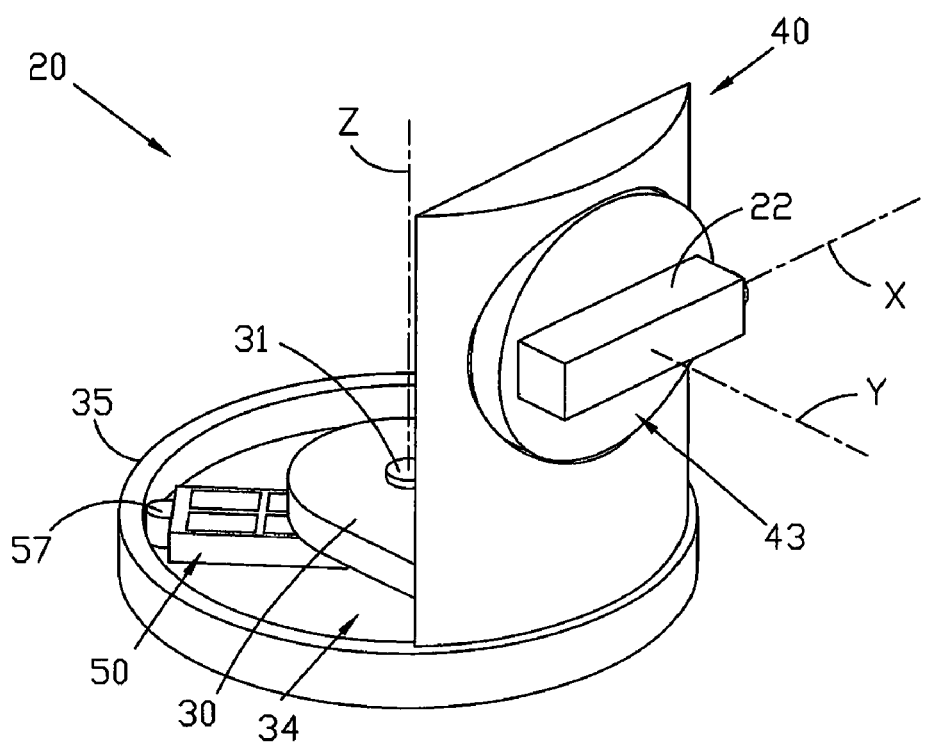

FIG. 2A shows a cable 10' connected between the base plate 32 of the first platform unit 30 and the second platform unit 40 in accordance with a second embodiment of the present invention. The cable 10' comprises a first terminal 12' attached to the base plate 32 of the first platform unit 30, and a second terminal 14' attached to an extension portion of the second platform unit 40. The main portion of the cable 10' between the terminals 12' and 14' is arranged to wind around the extension portion of the second platform unit 40 when the second platform unit 40 is rotated about the axis Y with respect to the first platform unit 30. The cable 10' has a C configuration when the main portion thereof is unwound. Alternatively, the cable 10" may have an S configuration when the main portion thereof is unwound, as shown in FIG. 2B. Alternatively, the cable 10''' may wind around the shaft 41 of the second platform unit 40, as shown in FIG. 2C. The shaft 41 of the second platform unit 40 is rotatably received in a hole formed in the support plate 33 of the first platform unit 30. One terminal of the cable 10''' is attached to the first platform unit 30 and the other terminal extends through a void or hollow center of the shaft 41. The main portion of the cable 10''' between the terminals is arranged to wind around the shaft 41 of the second platform unit 40 when the second platform unit 40 is rotated about the axis Y with respect to the first platform unit 30.

FIGS. 3A-3D show an omni-directional camera system 20 applying the platform described before. The system 20 comprises a base 34, a first platform unit 30, a second platform unit 40 and a camera 22 with an optical axis X attached to the second platform unit 40. The base 34 has a cylindrical rim 35. The center of the rim 35 is located on the first axis Z. At least one piezoelectric motor 50 is mounted to the first platform unit 30, using any suitable mounting frame (not shown) known in the art so that it does not rotate relative to the platform 30 and is operable to apply force to the rim 35, which rotates the first platform unit 30 and therefore the second platform unit about the axis Z.

Optionally piezoelectric motor 50 is a type of motor described in U.S. Pat. No. 5,453,653, the disclosure of which is incorporated herein by reference. The motor comprises a thin rectangular ceramic piezoelectric vibrator 51 having front and back planar face surfaces 53, relatively long left and right surfaces 54 and relatively short top and bottom surfaces 55 and 56 respectively. A friction nub 57 is located on the top surface 55 of the vibrator 51.

Optionally, four quadrant electrodes 58 are located in a symmetric pattern on the front surface 53. A single large common electrode (not shown) is located on the back surface 53. A resilient member (not shown) urges the piezoelectric motor 50 to cause the friction nub 57 to resiliently contact the inner surface of the rim 35. A controller (not shown) electrifies the common electrode and a pair of the quadrant electrodes 58 to cause the vibrator 51 to vibrate, which results in the friction nub 57 applying force to the rim 35 which accordingly rotates the first and second platform units 30 and 40 selectively clockwise or counter clockwise about the axis Z.

The second platform unit 40 comprises an optionally circular disc-like camera mounting plate 43. Camera 22 is optionally mounted to an outside surface 42 of the mounting plate 43. The mounting plate 43 seats in a circular recess 44 of the second platform unit 40 such that the mounting plate 43 is freely rotatable about the axis Y. A piezoelectric motor 60 having a friction nub 61, optionally similar to the piezoelectric motor 50 is mounted in a slot 46 formed in an inside surface 47 of the mounting plate 43. A resilient element 48 urges the motor 60 such that the friction nub 61 presses resiliently against a surface 49 of the recess 44.

In operation, the controller controls electrification of the piezoelectric motor 60 to generate vibrations in the motor's friction nub 61 and thereby apply force to the surface 49 to selectively rotate the camera-mounting plate 43 clockwise or counter clockwise about the axis Y. Optionally the axis Y is perpendicular to the axis Z. By controlling the piezoelectric motor 50 to rotate the first and second platform units 30 and 40 through an appropriate angle about axis Z and the piezoelectric motor 60 to rotate the second platform unit 40 (i.e., the camera mounting plate 43) about axis Y through an appropriate angle, the controller positions the optic axis X of the camera 22 along substantially any direction in a $4\pi$ steradian solid angle of directions. The cable 10 connected between the base 34 and the first platform unit 30 may be used to transmit power and data information to the piezoelectric motor 50, and the cable 10', 10", 10'" connected between the first and second platform units 30 and 40 may be used to transmit power to the piezoelectric motor 60 and together with the cable 10 to transmit image data information generated by the camera 22 to outside electric devices.

Figure 4A:
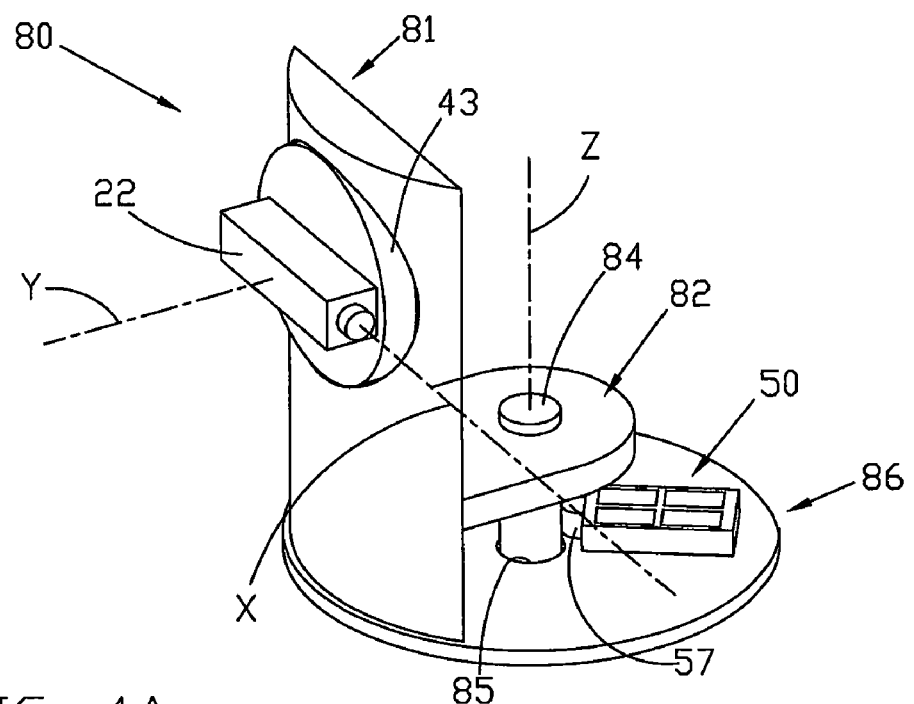
FIGS. 4A-4B show another camera system applying a platform in accordance with a fourth embodiment of the present invention.
Figure 4B:
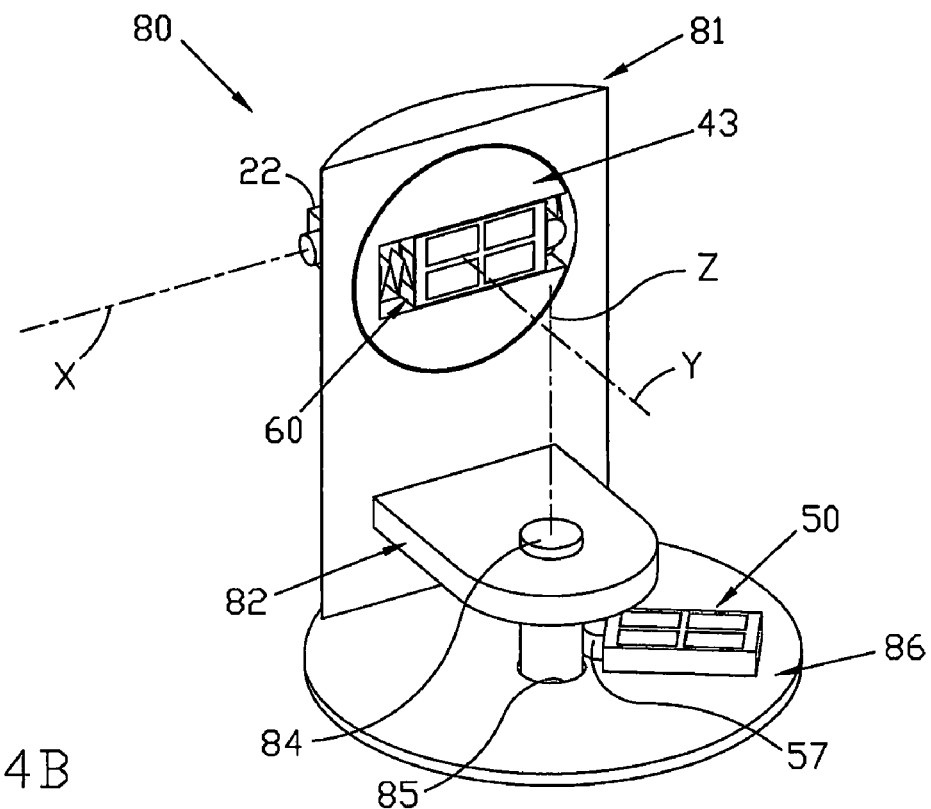

FIGS. 4A and 4B show another omni-directional camera system 80 in accordance with an alternative embodiment of the invention. The system 80 comprises a first platform unit 82 and a second platform unit 81 mounted to the first platform unit 82. The second platform unit 81 is optionally similar to the second platform unit 40 in the omni-directional system 20 shown in FIGS. 3A-3D and comprises a camera mounting plate 43 to which a camera 22 and piezoelectric motor 60 are mounted. The mounting plate 43 seats in a round recess of the support plate of the first platform unit 82 such that it is freely rotatable about the axis Y. The first platform unit 82 has a shaft 84 which is rotatably mounted in a socket 85 in a base 86. The main difference between the system 80 and the system 20 is that in the system 80 the piezoelectric motor 50 is mounted to the base 86 and the frictional nub 57 of the motor 50 resiliently contacts with the circumferential surface of the shaft 84. A controller (not shown) controls the piezoelectric motor 50 to excite vibrations in its friction nub 57 to selectively rotate the shaft 84 and thereby the first and second platform units 82 and 81 clockwise or counter clockwise about axis Z of the shaft 84. The controller controls the piezoelectric motor 60 to rotate the camera mounting plate 43 about axis Y. In this embodiment, if a flexible cable is wound around the shaft 84, the flexible cable would be offset from the frictional nub 57 in the axis Z.

Figure 5A:
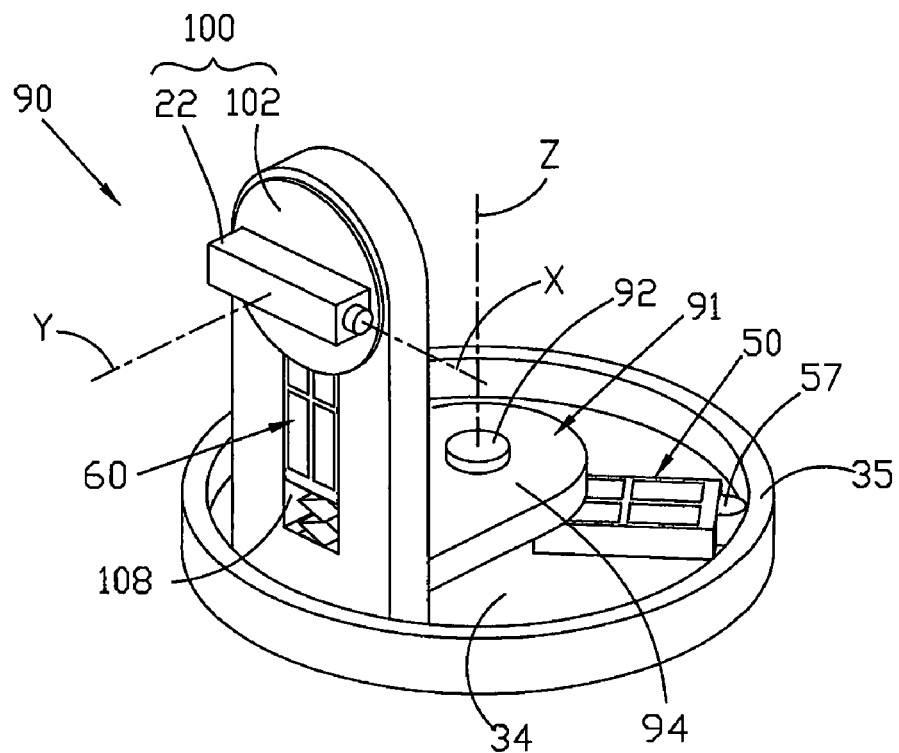
FIGS. 5A-5B show a further another camera system applying a platform in accordance with a fifth embodiment of the present invention.
Figure 5B:
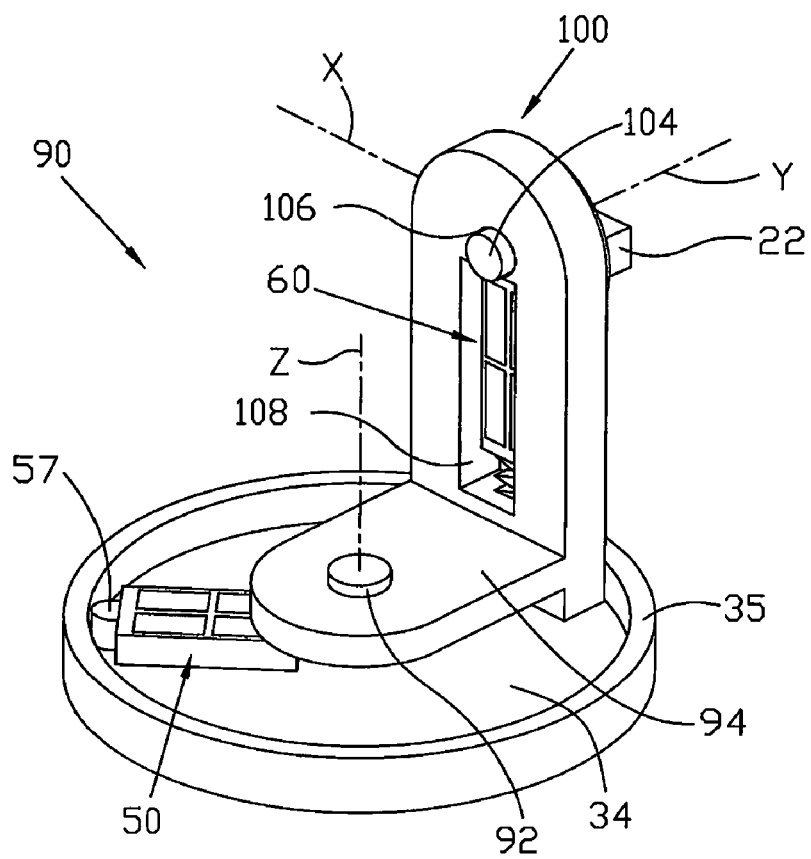

FIGS. 5A and 5B schematically show an omni-directional camera system 90 in accordance with a further alternative embodiment of the invention. Similarly to the omni-directional camera system 20, the omni-directional camera system 90 comprises a first platform unit 91 having a base plate 94, a support plate 93 and a shaft 92 rotatably mounted to a base 34 having a rim 35. A piezoelectric motor 50 is mounted to the first platform unit 91 and has a friction nub 57 that resiliently presses against the inner surface of the rim 35. When the piezoelectric motor 50 is electrified the friction nub 57 applies a force to the rim 35 to thereby rotate the piezoelectric motor 50 together with the first platform unit 91 selectively clockwise or counter clockwise about axis Z of the shaft 92 with respect to the base 34 and the rim 35. The support plate 93 of the first platform unit 91 has a slot 108 parallel to axis Z, and a hole 106 communicating with the end of the slot 108. The second platform unit 100 comprises a mounting plate 102 and a camera 22 is mounted to the mounting plate 102. The mounting plate 102 is rotatably attached to the support plate 93 via a shaft 104 which is securely fixed to or integrally formed with the mounting plate 102 and is rotatably received in the hole 106. The second piezoelectric motor 60 is accommodated in the slot 108. A resilient member urges the second piezoelectric motor 60 to cause the friction nub of the motor 60 to resilient press against the shaft 104. The controller controls vibrations of the piezoelectric motor 60 to selectively rotate the shaft 104 together with the mounting platform 102 and camera 22 about the axis Y of the shaft 104.

Figure 6:
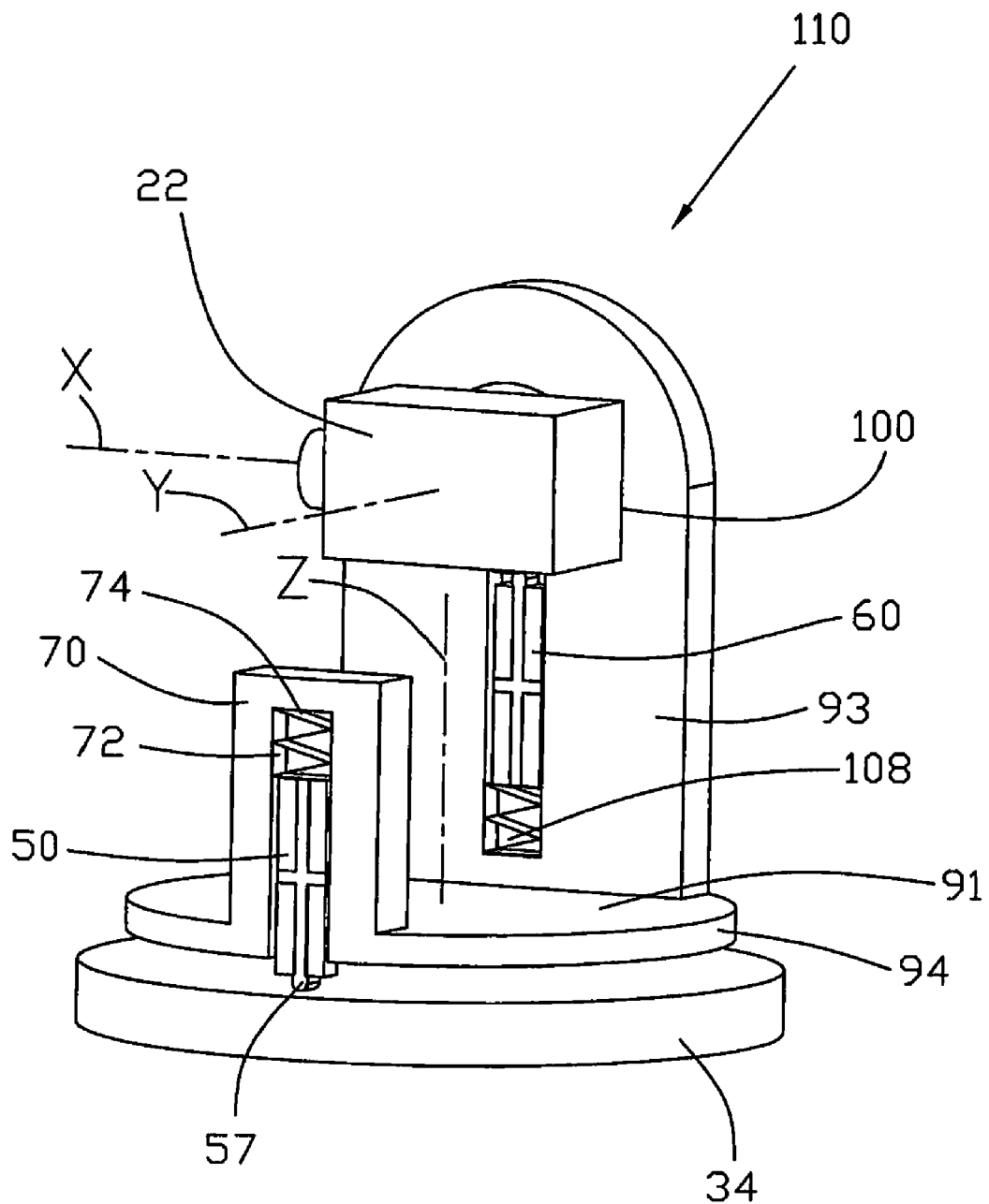
FIG. 6 shows a further alternative camera system applying a platform in accordance with a sixth embodiment of the present invention.

FIG. 6 schematically shows an omni-directional camera system 110, in accordance with another further alternative embodiment of the invention. The omni-directional camera system 110 comprises a first platform unit 91 rotatably mounted to a base 34, and a second platform unit 100 mounted to the support plate 93 of the first platform unit 91. A camera 22 is mounted to a camera mounting plate (not shown) of the second platform unit 100 and a shaft of the camera mounting plate is rotatably mounted to the support plate of the first platform unit 91 and rotatable by a second piezoelectric motor 60, optionally mounted in a slot 108 in the support plate of the first platform unit 91, as per the arrangement of the embodiment of FIGS. 5A-5B.

The first platform unit 91 has a motor mount 70 extending from the base plate 94 thereof optionally in a direction substantially parallel to the axis Z of rotation of the platform 91 and in a direction away from the base 34. Motor mount 70 has a slot 72 for receiving the first piezoelectric motor 50 and resilient members in the form of a spring 74 for urging the nub 57 of the first piezoelectric motor 50 into frictional contact with a surface of the base 34. The controller (not shown) controls vibration of the first piezoelectric motor 50 to rotate the first platform unit 91 together with the second platform unit 100 selectively clockwise or counter clockwise with respect to the base 34.

As a variation, the first piezoelectric motor 50 may be mounted to a recess formed in the support plate 93 of the first platform unit 91 so as to lie next to and parallel to the second piezoelectric motor 60, although facing in the opposite direction. Moreover, motor mount 70 may be located next to, formed as a part of or combined with, the support plate of the first platform unit 91.

The invention has been described with reference to embodiments thereof that are provided by way of example and are not intended to limit the scope of the invention. The described embodiments comprise different features, not all of which are required in all embodiments of the invention. Some embodiments of the invention utilize only some of the features or possible combinations of the features. Variations of embodiments of the described invention and embodiments of the invention comprising different combinations of features than those noted in the described embodiments will occur to persons of the art.

For example, the flexible cable may be any kind of flexible transmitting device such as a flexible printed circuit board. For any of the motor and platform configurations, the camera mounting plate can be mounted so as to have the optic axis of the camera (axis X), the first axis (the rotational axis of the first platform unit, axis Z) and the second axis (the rotational axis of the camera mounting plate, axis Y), all intersect at a single point. Also, to give a smoother image movement, there may be an advantage in having the center of the image plane of an image sensor of the camera aligned with the intersection of the first axis Z and the second axis Y.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A platform, comprising:
    a base;
    a first platform unit rotatably mounted to the base and being rotatable about a first axis relative to the base;
    a second platform unit rotatably mounted to the first platform unit and being rotatable about a second axis relative to the first platform unit; and
    a flexible transmitting device connected between the base and the first platform unit and at least one of the first platform unit and the second platform unit for transmitting at least one of power and data,
    wherein the flexible transmitting device winds about at least one of the first axis and the second axis when at least one of the first platform unit is rotated about the first axis and the second platform unit is rotated about the second axis;

wherein the first platform unit is rotatably attached to the base via a shaft which is fixed to or integrally formed with the first platform unit, the flexible transmitting device being connected between the base and the first platform unit and winding around the shaft when the first platform unit is rotated about the first axis; and wherein the shaft has a void, one end of the flexible transmitting device is fixed relative to the base and the other end thereof extends through the void of the shaft and an opening defined in the first platform unit to be fixed relative to the first platform unit.

2. A platform comprising:
a base;
a first platform unit rotatably mounted to the base and being rotatable about a first axis relative to the base;
a second platform unit rotatably mounted to the first platform unit and being rotatable about a second axis relative to the first platform unit; and
a flexible transmitting device connected between the base and the first platform unit and/or the first platform unit and the second platform unit for transmitting at least one of power and data,
wherein the flexible transmitting device winds about at least one of the first axis and the second axis when at least one of the first platform unit is rotated about the first axis and the second platform unit is rotated about the second axis; and
wherein the flexible transmitting device is a flexible cable or flexible printed circuit board.

3. The platform of claim 2, wherein the flexible transmitting device is connected between the first platform unit and the second platform unit, one end of the flexible transmitting device is fixed relative to the first platform unit and the other end thereof is fixed relative to the second platform unit.

4. The platform of claim 3, wherein the second platform unit is rotatably attached to the first platform unit via a shaft of the second platform unit being rotatably received in a hole of the first platform unit, the flexible transmitting device is arranged to wind around the shaft when the second platform unit is rotated.

5. The platform of claim 3, wherein the flexible transmitting device has an S or C shaped configuration when it is unwound.

6. A platform comprising:
a base;
a first platform unit rotatably mounted to the base and being rotatable about a first axis relative to the base;
a second platform unit rotatably mounted to the first platform unit and being rotatable about a second axis relative to the first platform unit; and
a flexible transmitting device connected between the base and the first platform unit and/or the first platform unit and the second platform unit for transmitting power and/or data,
wherein the flexible transmitting device winds about the first axis and/or the second axis when the first platform unit is rotated about the first axis and/or the second platform unit is rotated about the second axis; and
wherein the first platform unit is rotatable by a piezoelectric motor which is attached to one of the first platform unit and the base, the motor having a frictional nub to contact the other one of the first platform unit and the base.

7. The platform of claim 6, wherein the first platform unit comprises a shaft rotatably received in a hole formed at the base, the motor being mounted to the base and the friction nub pressing resiliently against the outer circumferential surface of the shaft.

8. The platform of claim 6, wherein the base comprises a circular rim, the motor being mounted to the first platform unit and the nub pressing resiliently against an inner circumferential surface of the rim.

9. The platform of claim 6, wherein the first platform unit defines a slot parallel to the first axis, the motor being received in the slot.

10. A platform comprising:
a base;
a first platform unit rotatably mounted to the base and being rotatable about a first axis relative to the base;
a second platform unit rotatably mounted to the first platform unit and being rotatable about a second axis relative to the first platform unit; and
a flexible transmitting device connected between at least one of the base and the first platform unit and the first platform unit and the second platform unit for transmitting at least one of power and data,
wherein the flexible transmitting device winds about at least one of the first axis and the second axis when at least one of the first platform unit is rotated about the first axis and the second platform unit is rotated about the second axis; and
wherein the first platform unit comprises a base plate rotatably attached to the base, and a support plate extending from the base plate, and the second platform unit comprises a mounting plate rotatably attached to the support plate, a camera being mounted to the mounting plate.

11. The platform of claim 10, wherein the support plate defines a recess in which the mounting plate is rotatably received, the mounting plate defines a slot on which a piezoelectric motor with a frictional nub and a resilient element are received, the resilient element urging the motor such that the friction nub presses resiliently against a surface of the recess.

12. The platform of claim 10, wherein the second platform unit further comprises a shaft fixed relative to the mounting plate, the support plate defines a slot in which a piezoelectric motor with a frictional nub and a resilient element are received, and a hole in which the shaft is rotatably received, the resilient element urging the motor such that the friction nub presses resiliently against the outer circumferential surface of the shaft.

13. The platform of claim 10, wherein the first axis is perpendicular to the second axis.

14. A platform comprising:
a base;
a first platform unit rotatably mounted to the base and being rotatable about a first axis relative to the base;
a flexible transmitting device connected between the base and the first platform unit for transmitting at least one of power and data,
wherein the flexible transmitting device winds about the first axis when the first platform unit is rotated about the first axis;
wherein the first platform unit is rotatably attached to the base via a shaft which is fixed to or integrally formed with the first platform unit, the flexible transmitting device winding around the shaft when the first platform unit is rotated about the first axis; and
wherein the first platform unit is rotatable by a piezoelectric motor which is attached to one of the first platform unit and the base, the motor having a friction nub which contacts the other one of the first platform unit and the base.

15. The platform of claim 14, wherein the motor is mounted to the base and the friction nub presses resiliently against the outer circumferential surface of the shaft.

16. The platform of claim 14, wherein the base comprises a circular rim, the motor being mounted to the first platform unit and the friction nub pressing resiliently against an inner circumferential surface of the rim.

17. A platform comprising:
a base;
a first platform unit rotatably mounted to the base and being rotatable about a first axis relative to the base;
a second platform unit rotatably mounted to the first platform unit and being rotatable about a second axis relative to the first platform unit; and
a flexible transmitting device for transmitting at least one of power and data, the flexible transmitting device comprising a first terminal, a second terminal, and a flexible body between the first and second terminals,
wherein the first and second terminals are respectively fixed relative to at least one of the base and the first platform unit and the first platform unit and the second platform unit, and the flexible body winds about at least one of the first axis and the second axis when at least one of the first platform unit is rotated about the first axis and the second platform unit is rotated about the second axis.

18. The platform of claim 17, wherein the first platform unit is rotatably attached to the base via a shaft which is fixed to or integrally formed with the first platform unit, the flexible transmitting device being connected between the base and the first platform unit and winding around the shaft when the first platform unit is rotated about the first axis.

19. The platform of claim 18, wherein the shaft comprises a void therethrough; the first terminal is fixed relative to the base, the flexible body extends through the void of the shaft and an opening defined in the first platform unit, and the second terminal is fixed relative to the first platform unit.

20. The platform of claim 17, wherein the flexible transmitting device is connected to the first platform unit and the second platform unit, the first terminal is fixed relative to the first platform unit and the second terminal is fixed relative to the second platform unit.

* * * * *